3,318,554
MOUNTING ARRANGEMENT FOR ENGINES
Peter Arthur Ward, Derby, John Albert Mullins, Darley Abbey, Derby, and Martin Hume Bryan-Brown, Etwall, England, assignors to Rolls-Royce Limited, Derby, England
Filed Aug. 2, 1965, Ser. No. 476,532
Claims priority, application Great Britain, Sept. 22, 1964, 38,705/64
3 Claims. (Cl. 244—54)

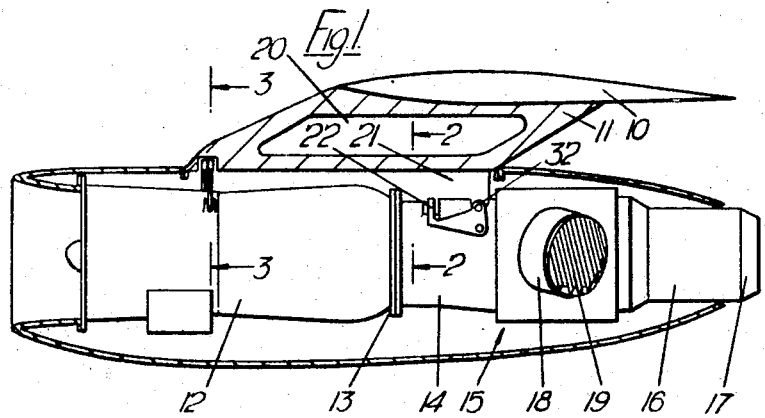
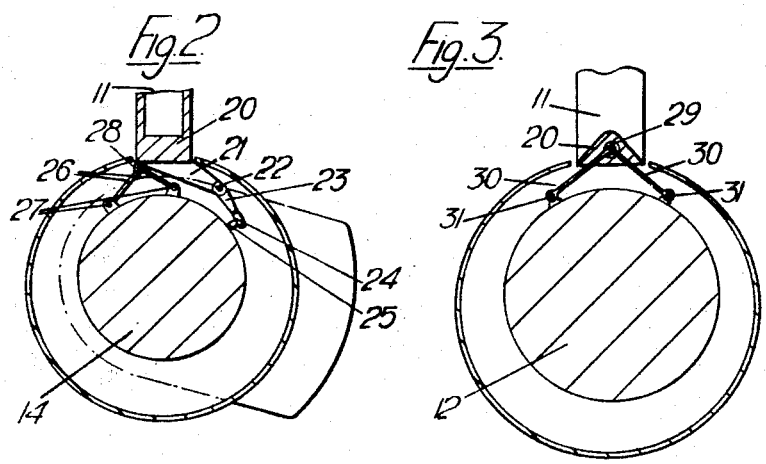

This invention relates to mounting arrangements for engines.

According to the present invention a mounting arrangement for a gas turbine engine comprises deflector means to deflect the exhaust gases of the said engine, and attachment means for connecting the said deflector means to the said engine, a first mounting means comprising a pivotable link connected between the deflector means and aircraft structure which swings in a direction substantially perpendicular to the axis of the engine and which supports part of the weight of the engine and transmits the loads produced on the deflector means by the exhaust gases of the engine to aircraft structure, and stay means which prevent angular movement of the engine about its axis, and second mounting means for connecting the said engine to aircraft structure to support the remainder of the weight of the engine.

The engine may be adapted to be used both as a propulsion engine and as a lift engine. Thus the efflux of gases from the jet pipe of the engine may be normally so directed as to provide propulsive thrust on the aircraft in which the engine is mounted, the deflector means being operable at will to deflect the efflux in a downward direction to provide direct lift on the aircraft.

The first mounting means may comprise a swinging link which swings in a direction substantially perpendicular to the axis of the engine and which takes all thrust loads and a stay or stays which prevent angular movement of the engine about its axis.

The second mounting means may comprise a pair of stays attached to the engine to lie in a direction substantially at a tangent to the casing and depending from a single suspension point attached to the aircraft structure.

The invention will now be described with reference to the accompanying drawings in which:

FIGURE 1 shows a partly broken away side elevation of a gas turbine engine mounted according to the present invention from the wing of an aircraft;

FIGURE 2 is a section on the line 2—2 of FIGURE 1.

FIGURE 3 is a section on the line 3—3 of FIGURE 1.

Referring first to FIGURE 1, an aircraft wing 10 carries a pylon 11 on which is supported a gas turbine engine 12. At the exhust end of the engine 12 there is a flange 13 to which a deflector unit 15 is rigidly attached to the engine 12, the deflector unit having a forwardly extending extension pipe 14. The deflector unit 15 has attached thereto and extending rearwardly therefrom a jet pipe 16, the jet pipe 16 having a final nozzle 17 attached to its rear end.

The deflector unit 15 at a position intermediate the forward extension pipe 14 and the jet pipe 16 carries a stub nozzle 18 with cascades 19 and incorporates a valve by which the exhaust gases from the engine 12 may be alternatively directed through the jet-pipe 16 and final nozzle 17 or through the stub nozzle 18 and cascades 19. When the gases pass through the nozzle 17 they produce propulsive thrust; when they are directed through the nozzle 18 the cascades 19 turn the gases in the downward direction so that they produce direct lift.

Since the deflector unit 15 is rigidly attached to the engine 12 by means of the extension pipe 14, it is possible to support the engine and to take out all thrust loads acting on the deflector unit by way of a mounting which attaches part of the deflector unit 15 to aircraft structure. In the present case a strong piece of aircraft structure 20 inside the pylon 11 carries an arm 21 which projects from the pylon 11 just above the extension pipe 14. On the extremity of the arm 21 there is a hinge 22 and ball joint 32 which carry a link 23. The link 23 projects downwardly and is attached at its lower end by means of a ball and socket joint 24 to a spigot 25 which is rigidly attached to the extension pipe 14. The mounting made up of a spigot 25, link 23 and arm 21 takes all thrust loads acting on the deflector unti 15, in the axial direction and in the direction of downward extension of the link 23, into the aircraft structure.

In order to prevent the extension pipe 14 from pivoting about the hinges 22 two stays 26 are provided and are attached by way of ball and socket joints 27 to the extension pipe 14. The upper end of both the stays 26 is carried from a single ball and socket joint 28 attached to the strong piece 20.

In order to support the remaining weight of the engine the forward part of the engine is mounted from the strong part 20 as shown in FIGURE 3. The strong part 20 carries at its forward end the socket of a ball and socket joint 29 which carries the upper ends of two stays 30. The lower end of these stays are located in ball and socket joints 31, the sockets of which are rigidly attached to the casing of the engine 12.

What we claim is:

1. A mounting arrangement for a gas turbine engine comprising deflector means to deflect the exhaust gases of the said engine, and attachment means for connecting the said deflector means to the said engine, a first mounting means comprising a pivotable link connected between the deflector means and aircraft structure which swings in a direction substantially perpendicular to the axis of the engine and whtich supports part of the weight of the engine and transmits the loads produced on the deflector means by the exhaust gases of the engine to aircraft structure, and stay means which prevent angular movement of the engine about its axis, and second mounting means positioned forwardly of said first mounting means for connecting the said engine directly to aircraft structure to support the remainder of the weight of the engine.

2. A mounting arrangement for a gas turbine engine comprising deflector means to deflect the exhaust gases of the said engine, attachment means for connecting the said deflector means to the said engine, a first mounting means for connecting the deflector means to aircraft structure to support part of the weight of the engine and to transmit the loads produced on the deflector means by the exhaust gases of the engine to aircraft structure, and a second mounting means forward of said first mounting means for connecting said engine directly to aircraft structure to support the remainder of the weight of the engine, said second mounting means comprising stay means attached to the engine and lying in a direction substantially at a tangent to the casing and depending from a single suspension point on the aircraft structure.

3. A mounting arrangement for a gas turbine engine comprising deflector means to deflect the exhaust gases of the said engine, and attachment means for connecting the said deflector means to the said engine, a first mounting means comprising a pivotable link connected between the deflector means and aircraft structure which swings in a direction substantially perpendicular to the axis of the engine and which supports part of the weight of the engine and transmits the loads produced on the deflector means by the exhaust gases of the engine to aircraft structure, and stay means which prevent angular movement of the engine about its axis, second mounting means forward of said first mounting means for connecting said engine directly to aircraft structure to support the remainder of the weight of the engine, said second mounting means comprising further stay means attached to the engine and lying in a direction substantially at a tangent to the casing and depending from a single suspension point on the aircraft structure.

References Cited by the Examiner

UNITED STATES PATENTS

| | | | |
|---|---|---|---|
| 3,126,170 | 3/1964 | Dornier | 244—52 X |
| 3,201,070 | 8/1965 | Chilvers | 244—54 |
| 3,222,017 | 12/1965 | BoBo | 244—54 X |

FOREIGN PATENTS 1,160,826   8/1958   France.

MILTON BUCHLER, *Primary Examiner.*

B. BELKIN, *Assistant Examiner.*